United States Patent [19]

Okano et al.

[11] 4,300,387

[45] Nov. 17, 1981

[54] MEASUREMENT OF THE UNBALANCE OF A ROTOR BODY OF SMALL WEIGHT

[75] Inventors: Hiroshi Okano, Mishima; Masayoshi Hirano, Gotenba, both of Japan

[73] Assignee: Toyota Jidosha Kogyo Kabushiki Kaisha, Toyota, Japan

[21] Appl. No.: 103,929

[22] Filed: Dec. 17, 1979

[30] Foreign Application Priority Data

Oct. 13, 1979 [JP] Japan ............................. 54-131304

[51] Int. Cl.³ .............................................. G01M 1/06
[52] U.S. Cl. ....................................... 73/460; 73/487; 279/1 Q; 403/261
[58] Field of Search ............ 73/66, 459, 460, 462–468, 73/471–479, 487, 235, 481; 403/1, 259, 261; 279/1 S, 1 Q, 1 SG, 2 R; 29/229

[56] References Cited

U.S. PATENT DOCUMENTS

| | | | |
|---|---|---|---|
| 872,883 | 12/1907 | Adams | 403/261 |
| 1,192,404 | 7/1916 | Ewart | 403/261 |
| 1,650,573 | 11/1927 | Searles | 403/261 |
| 2,216,308 | 10/1940 | Ballman | 73/481 X |
| 2,319,655 | 5/1943 | Bennett | 73/477 X |
| 2,663,184 | 12/1953 | Merrill et al. | 73/466 |
| 3,203,221 | 8/1965 | Conner | 29/229 X |

FOREIGN PATENT DOCUMENTS

184387  8/1922  United Kingdom ................ 403/261

Primary Examiner—James J. Gill
Attorney, Agent, or Firm—Stevens, Davis, Miller & Mosher

[57] ABSTRACT

A method for effecting a measurement of the unbalance of a small weight rotor body such as a impeller or turbine wheel for a turbo-charger in an internal combustion engine. A shaft, on which the rotor body is inserted and which is on both ends thereof supported on a pair of bearing units, is rotated while the rotor body is held on the shaft under an elastic frictional force. The unbalance is at every angular position of the rotor body measured during the rotation of the shaft.

2 Claims, 6 Drawing Figures

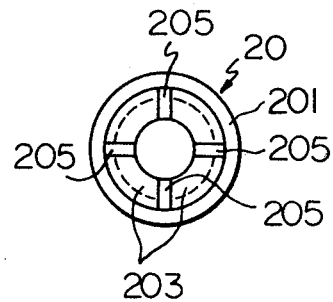
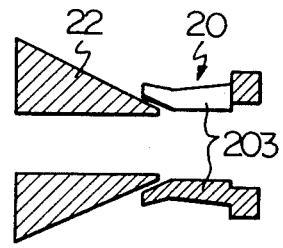
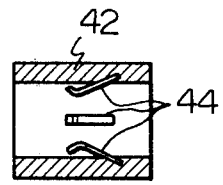
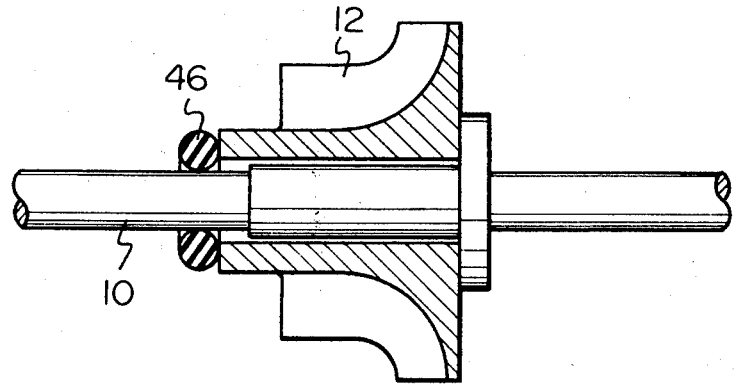

MEASUREMENT OF THE UNBALANCE OF A ROTOR BODY OF SMALL WEIGHT

DESCRIPTION OF THE INVENTION

The present invention relates to a method for measuring the unbalance of a small weight rotor body, such as an impeller provided in a turbo-charger for a vehicle internal combustion engine and a rotor holding device utilized for carrying out the method.

In a principal method for measuring the unbalance of a rotor body, the rotor body is inserted into and fixed to a shaft of a balance tester, the shaft is rotated under a predetermined speed while the unbalance at every angular position of the rotor is measured, and a mass corresponding to the measured unbalance is, at every angular position of the rotor body, removed from or added to the rotor body. Therefore, when an angular displacement of the rotor body with respect to the shaft is generated during the rotation of the shaft, a precise measurement of the unbalance cannot be carried out. Therefore, in the prior art, a positive fixing unit, such as a nut is utilized, which is screwed into the shaft for fixedly connecting the rotor body on the shaft.

However, the prior art method suffers from a drawback in that a precise measurement cannot be effected when the weight of a rotor body is small. This is because the unbalance caused by the nut on the shaft is, on one hand, not negligibly small when compared with the rotor body due to the small weight of the rotor body, and the angular position of the nut with respect to the shaft is, on the other hand, not always maintained at a predetermined angle. Further, a tightening force applied to the rotor body causes it to be deformed, which also decreases the preciseness of the measurement. The preciseness is also decreased by the fact that the nut or shaft is damaged during the tightening. The tool has flat surfaces for engaging the nut, which also adversely affects the preciseness of the measurement of the unbalance.

The prior art suffers from another drawback in that a tiresome labor is necessary for connecting the rotor body to the shaft, since the nut must be screw threaded into the shaft.

Therefore, an object of the present invention is to provide a method for effecting a precise measurement of the unbalance of a small weight rotor body.

Another object of the present invention is to provide an improved holder for connecting the rotor body to a shaft of a balance tester, capable of effecting the measurement with a high precision.

According to one aspect of the present invention, a method for measuring the unbalance of a rotor body of small weight is provided, which comprises the steps of: inserting the rotor body onto the shaft; placing the shaft on a pair of axially spaced apart bearing units so that the rotor body is located between the bearing units; rotating, at a predetermined speed, the shaft, while the rotor body is angularly held on the shaft under a frictional force generated between the rotor body and the shaft, and; detecting, during the rotation of the rotor body, the unbalance of the rotor body at each angular position of the rotor body.

According to another aspect of the invention, a device for holding a rotor body in a balance tester is provided with a pair of axially spaced apart bearing units, which device comprises: a shaft having axially spaced apart ends, which are rested on the respective bearing units, the rotor body being adapted to be inserted to the shaft, the shaft having a stopper for determining an axial position of the rotor body on the shaft, and; a holder means for generating a force urging the rotor body so that the rotor body is, on the other side thereof, touched with the stopper.

The present invention is now explained in more detail with reference to the attached drawings in which:

FIG. 3 is a front view of the rotor of FIG. 2 taken from the line III in FIG. 2.

FIG. 4 is a longitudinal sectional view illustrating a tool for disengaging the holder from the shaft.

FIG. 5 is a cross-sectional view indicating another embodiment of the holder.

FIG. 6 is a longitudinal cross-sectional view indicating still another embodiment of the invention.

Figure 1:
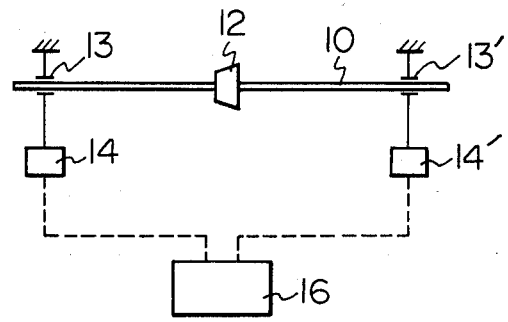
FIG. 1 is a schematic diagram illustrating a system for measuring a dynamic balance of a rotor body.

Referring to FIG. 1, which schematically illustrates a balance tester, a supporting shaft 10 on which a rotor body 12 to be tested is mounted. The supporting shaft 10 is, on its ends, supported by a pair of axially spaced apart bearing units 13 and 13'. A pair of pick-up or transducer devices 14 and 14' is adapted for detecting the force generated in the corresponding bearing units 13 and 13', respectively, during the rotation of the shaft 10. The force corresponds to the displacement of the shaft 10. Electrical signals from the pick-up devices are introduced into an electrical control circuit 16 for indicating the unbalance of the rotor body 12 being tested.

Figure 2:
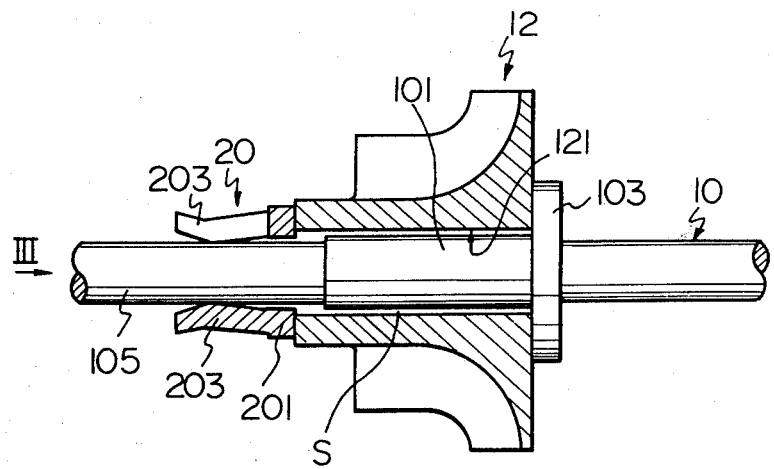
FIG. 2 is a longitudinal sectional view illustrating a holder for connecting the rotor body to the shaft.

Referring now to FIG. 2, mounting of the rotor body 12 onto the supporting shaft 10 is illustrated. The shaft 10 has an annular projection 103 serving as a stopper for the rotor body 12. On one side of the stopper 103, the shaft 10 has a first portion 101 of large diameter on which the rotor body 12 is placed and a second portion 105 of small diameter. Therefore, the shaft 10 forms a body of rotation which can be easily made by a lathe without generation of any unbalance.

In this embodiment, the rotor body 12 is an impeller utilized in a turbo-charger for an internal combustion engine. The rotor body 12 has a central bore 121, which is inserted on the first portion 101 of the shaft 10. Although an annular slits formed between the inner surface of the bore 121 of the rotor body 12 and the outer surface of the portion 101 of the shaft is exaggerated in the drawing, the slits are as small as possible to permit the rotor body 12 to be inserted into the shaft portion 101 under a normal temperature, without any disturbance. It should be noted that the degree of unbalance caused by the slits is small so that no adverse effect occurs, so that the preciseness in the measurement of the unbalance of the rotor body 12 is not affected. The stopper 103 has a diameter which is as small as possible so as to permit a machine tool to come in contact with the rotor body 12. Thus, a machine tool can be applied to the side of the rotor body adjacent to the stopper 103 for removing mass from the rotor body corresponding to the measured unbalance of the rotor body 12 at every position of the rotor body.

As shown in FIG. 2, a holder sleeve 20 is arranged on the side of the rotor body 12 remote from the stopper 103, for fixedly securing the rotor body 12 on the shaft 10. The holder 20 forms, as shown by FIG. 3, a slit sleeve which is comprised of a ring shaped base portion 201 and angularly spaced apart catch portions 203, each of which extends axially from the ring shaped base portion 201, in order to allow an elastic deformation in a radial direction. Each of the catch portions 203 has, along the length thereof, an inwardly bent portion 203, which contacts with the portion 105 of the shaft 10 under a slightly radially expanded condition, so that a frictional force for connecting the rotor body 12 to the shaft 10 is generated, as will be fully described later. It should be noted that the width and the depth of the slits 205 formed between the adjacent catch portions 203 are selected so that an appropriate elastic force is obtained.

Measurement of the unbalance of a rotor body according to the present invention is hereinafter described. A rotor body 12 to be tested is inserted on the portion 101 of the shaft 10 until the rotor body 12 is, on one side thereof, contacted with the stopper 103. Secondly, the holder 20 is inserted on the shaft 10 so that the base portion 201 of the holder 20 contacts with the other side of the rotor body 12 remote from the stopper 103. In this case, the catch member 203 is contacted with the portion 105 of the shaft 10 while the catch portion 203 is resiliently and outwardly deformed. As a result of this, a frictional force is generated in the contacted surfaces between the rotor body 12 and the holder 20. Due to this frictional force, the rotor body 12 is substantially fixedly connected to the shaft 10. This frictional connection is stable, since the weight of the rotor body is 50 g or less.

In order to measure the unbalance of the rotor 12, the ends of the shaft 10, on which the rotor body 12 is mounted, as described above, rest on the respective bearing units 13 and 13' shown in FIG. 1. Then, the shaft is rotated under a predetermined constant speed, while the transducers 14 and 14' produce, at every angular position of the rotor 12, electrical signals corresponding to the unbalance of the rotor at the angular position. The electrical signals are transmitted to the control unit 16 in order to indicate the unbalance and to effect the necessary correction, as is well known to those skilled in this art. During the rotation of the shaft 10, to which the rotor body 12 is connected by the frictional force generated by the holder, no angular displacement of the rotor body with respect to the shaft 10 occurs, since the aerodynamic force generated between the rotor body 12 and the shaft 10 is smaller than the frictional force when the weight of the rotor body is small.

According to the present invention, no deformation is generated in the rotor body 12, since a screw or nut connection of the prior art is not utilized. In addition to this, the holder 20 forms a body of rotation, so that unbalance caused by the holder is small when compared with the nut in the prior art. Therefore, a precise measurement of the unbalance of the rotor body can be carried out.

When the rotor body is withdrawn after the measurement of the unbalance, a conical tubular member as shown in FIG. 4 is utilized. The member 22 is inserted on the shaft 10 so that its narrow end portion is engaged with the ends of the catch members 203 of the holder 20. Due to the force applied to the member 22, the catch portions 203 are displaced outwardly, causing the portions 203 to be detached from the shaft 10. As a result of this, the holder 20 can be very easily removed from the shaft 10 while the shaft is not damaged by the catch portions 203. Preferably, the shaft 10 has, at the portion to which the catch portions are contacted, an outer surface layer of hardened material.

According to the present invention, connection of the rotor body to the shaft is effected by only inserting the rotor body onto the shaft. Thus, labour efficiency is increased when compared with the prior art.

In another embodiment of the present invention, a holder forms a sleeve 42 (FIG. 5) in which a plurality of equiangularly spaced apart leaf springs are arranged in the sleeve. Each of the springs 44 is slightly inclined and is fixedly connected to the inner surface of the sleeve 42.

In a further embodiment shown in FIG. 6, a holder is made as a ring member 46 made from a rubber material. The rubber ring is inserted into the shaft 10 in a slightly expanded condition so that it abuts the rotor body. As a result of this, frictional force for connecting the rotor body with respect to the shaft is generated.

While the present invention is described with reference to the embodiment, modifications or changes may be effected by those skilled in this art without departing from the scope of the present invention.

What is claimed is:

1. A device for holding a rotor body which is 50 g or less in a balance tester provided with a pair of axially spaced apart bearing units, said device comprising:

a shaft comprising a first or middle portion on which the rotor body is inserted, an annular stopper portion adjacent to the first portion, the stopper portion having a diameter larger than that of the first portion, the rotor body and the stopper portions engaging, at their facing side surfaces, with each other so that the rotor body is placed at a predetermined position of the shaft, and second or end portions connected to the first portion and the stopper portion, respectively, said second portions having a diameter smaller than the first portion, said second portions adapted to be rested on the respective bearing unit; and a sleeve member located on the second portion adjacent to the first portion for urging the rotor body toward the stopper body so that a frictional force is generated between said engaging surfaces of the rotor body and the stopper, said sleeve member comprising a tubular body and a plurality of equiangularly spaced catch members made of leaf springs extending from the inner surface of the tubular body.

2. A device for holding a rotor body which is 50 g or less in a balance tester provided with a pair of axially spaced apart bearing units, said device comprising:

a shaft comprising a first or middle portion on which the rotor body is inserted, an annular stopper portion adjacent to the first portion, the stopper portion having a diameter larger than that of the first portion, the rotor body and the stopper portions engaging, at their facing side surfaces, with each other so that the rotor body is placed at a predetermined position of the shaft, and second or end portions connected to the first portion and the stopper portion, respectively, said second portions having a diameter smaller than the first portion, said second portions adapted to be rested on the respective bearing unit;

a sleeve member located on the second portion adjacent to the first portion for urging the rotor body toward the stopper body so that a frictional force is generated between said engaging surfaces of the rotor body and the stopper; said sleeve member comprises a base portion of ring shape, and a plurality of equiangularly spaced apart catch members, the catch members extending from the base portion, and contacting with the second portions of the shaft, and a tubular member insertable to the second portion adjacent to the first portion, said tubular member having a conical narrow end portion engageable with the catch members for allowing the withdrawal of the sleeve member after the measurement of the balance.

* * * * *